W. G. SLAUSON & W. W. MACFARREN.
ADDRESSING MACHINE.
APPLICATION FILED OCT. 25, 1911.

1,196,815.

Patented Sept. 5, 1916.
7 SHEETS—SHEET 1.

WITNESSES

INVENTORS

W. G. SLAUSON & W. W. MACFARREN.
ADDRESSING MACHINE.
APPLICATION FILED OCT. 25, 1911.

1,196,815.

Patented Sept. 5, 1916.
7 SHEETS—SHEET 2.

FIG. 2

WITNESSES
INVENTORS

W. G. SLAUSON & W. W. MACFARREN.
ADDRESSING MACHINE.
APPLICATION FILED OCT. 25, 1911.

1,196,815.

Patented Sept. 5, 1916.
7 SHEETS—SHEET 6.

WITNESSES

INVENTORS

UNITED STATES PATENT OFFICE.

WILLIAM G. SLAUSON, OF PAINESVILLE, OHIO, AND WALTER W. MACFARREN, OF PITTSBURGH, PENNSYLVANIA; SAID MACFARREN ASSIGNOR TO SAID SLAUSON.

ADDRESSING-MACHINE.

1,196,815.  Specification of Letters Patent.  Patented Sept. 5, 1916.

Application filed October 25, 1911. Serial No. 656,621.

*To all whom it may concern:*

Be it known that we, WILLIAM G. SLAUSON, of Painesville, Lake county, Ohio, and WALTER W. MACFARREN, of Pittsburgh, Allegheny county, Pennsylvania, have invented a certain new and useful Improvement in Addressing-Machines, of which the following is a specification.

Our invention relates to that class of machines in which the supply of newspapers, periodicals, envelops, post-cards, or other matter to be addressed is fed past the printing point and is there operated upon by a metal printing plate containing addresses in type; the said printing plates being fed successively from a reservoir one for each article to be addressed.

The prime object of our invention is to produce a machine of this character which is cheap in construction and reliable and extremely rapid in operation. To these ends we have dispensed with mechanical devices for gripping and holding the address plate as it is moved from the reservoir to the printing point and back again, and have substituted therefor, magnet devices which are cheaply built, reliable in operation and permit of obtaining speeds not hitherto possible by any other means.

Briefly stated, our invention consists in a cylinder provided with a magnet, or more usually a series of magnets, spaced evenly around its circumference in a single plane, the same being preferably electro-magnets connected with a supply of electric current, as distinguished from permanent or so called fixed magnets; in combination with means for feeding address plates to and from the magnet cylinder and with means for feeding articles past the magnet cylinder so that they will successively come in contact with one of the address plates to receive the address.

While our invention is primarily intended to apply to a separate addressing machine which is supplied with the complete articles ready for addressing, yet it is capable of much more extended use; as for instance in newspaper work a magnet and the necessary feeding devices for the printing plates can be applied directly to the press so that each paper is addressed simultaneously with the printing operation.

Our invention can also be used for printing successively addresses upon a continuous web of paper which is afterward cut into sections for periodical wrappers.

Referring to the drawings.

The machine consists of a pair of side frames 1 mounted on legs 2. An inclined chute 3 comprising side guards 4 and the moving bottom formed by tapes 5 is secured to the side frames 1. The tapes 5 pass over pulleys 6 and 7 mounted on the shafts 8 and 9 which are preferably mounted in anti-friction bearings, the inclination of the chute 3 being sufficient for the magazines to feed downward by gravity as fast as the lower magazines are removed. The lower magazine 10 rests against the impression cylinder 11 and the feeder plate 12.

The impression cylinder 11 is carried by a shaft 13 mounted on the side frames 1. It will be understood that all shafts are supported in bearings in the side frames 1, unless otherwise specified. A shaft 15 parallel to shaft 13 is mounted in rigid bearings 16 fixed to the side frames 1. Upon the shaft 15 there are mounted one or more main magnet cylinders 17 (in this case 2 are shown), and below the main magnet cylinders 17 there are mounted, a pair of supplementary magnet cylinders 18 upon a shaft 19. A shaft 20 is mounted below the impression cylinder 11 in suitable bearings, 21.

A pulley 22 mounted on the shaft 20 receives power through a belt 23 from a motor 24 which drives the machine. The shaft 20 is provided with two equal pinions 25 and 26 one at each side of the machine. The pinion 26 meshes with a gear 27 at the end of the impression cylinder 11 and drives the same. The pinion 25 meshes with a gear 28 upon a shaft 29. The gear 28 in turn meshes with an equal gear 30 upon a shaft 31. The gear 30 meshes in turn with an equal gear 32 upon the shaft 19. The gear 32 meshes with and drives a gear 33 upon the shaft 15.

The back of the feeder plate 12 rests against several rollers 34 mounted on a shaft 35. The feeder plate 12 is secured to a pair of arms 36 which are guided by the rollers 37 and 38 upon shafts 39 and 40. A rock shaft 41 carries a pair of levers 42 which are each connected to one of the arms 36 by a link 43. A lever 44 is connected to a swinging link 45 which in turn receives motion from a guided link 46, the same being guided by the small rollers 47 mounted on one of the side frames 1.

Figures 3, 19:
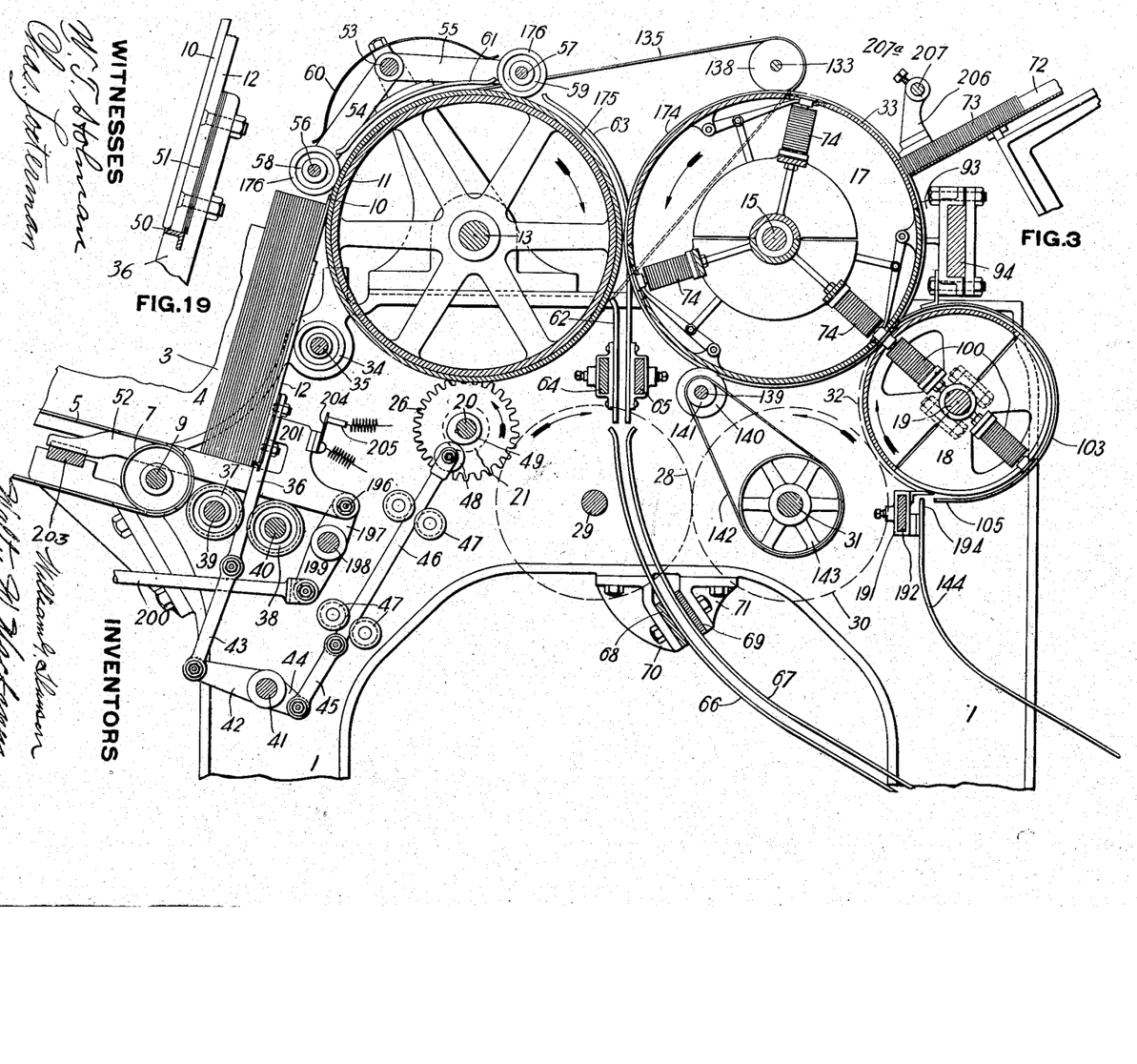
Fig. 3 is an enlarged sectional elevation of the principal working parts.
Fig. 19 is an enlarged sectional elevation of the lower edge of the feeder plate.

At the upper end of the link 46 there is mounted a cam roller 48 which engages a cam 49 upon the shaft 20. A small angle 50 is notched into the arms 36 and extends across the bottom of the feeder plate 12 in order to form a ledge to lift the first magazine 10 as shown in Fig. 19. Liners 51 are provided to vary the width of the ledge. The tapes 5 are freely movable, and at a sufficient inclination to the horizontal to keep the magazines packed firmly against the feeder plate 12 by gravity. Just before reaching the pulley 7 the magazines pass onto the guides 52 and after passing pulley 7 their lower edges are resting upon the guides 52. A stationary shaft 53 mounted over the impression cylinder 11 carries two pairs of swinging arms 54 and 55 each of which in turn support shafts 56 and 57 upon which are mounted two or more gripping rollers 58 and 59. Springs 60 press the gripping rollers against the impression roller 11 by which they are driven. Stationary guides 61 extend between the gripping rollers 58 and 59 these being secured to shaft 53. A number of adjustable guides 62 and 63 are mounted on cross bars 64 and 65 secured to the frames 1. The guides 62 and 63 can be adjusted across the machine for reasons which will hereinafter appear. A number of stationary delivery guides 66 and 67 are mounted on cross bars 68 and 69, the latter being secured to brackets 70 and 71 mounted on the side frames 1.

The ratio between the pinion 25 and the gear 27 may be any convenient whole number; in the present design it is 3 to 1, the shaft 13 making about 25 revolutions per minute and the shaft 20 making .75 revolutions per minute. Since the gripping rollers 58 are continuously driven by the impression roller 11, it follows that a slight upward movement of the first magazine 10 produced by the feeder plate 12 of which the ledge 50 is in effect a part, will raise the top edge of the magazine in position to be gripped and carried around the impression cylinder 11, being discharged between the guides 66 and 67. Since the cam 49 makes three revolutions to one of the impression cylinder 11, three magazines will be fed to the impression cylinder at each revolution thereof, and as shown in Fig. 3 the circumference of the impression cylinder is three times the width or height of the magazine plus about 3″, thus spacing the magazines on the impression cylinder about 1″ apart. It will be noted that the magazines are constrained to follow the curve of the impression cylinder by the guides 61 and 63 and that at the printing point in the horizontal plane passing through shafts 13 and 15 they are firmly held against the cylinder 11 by rubber rings 174 on the magnet cylinder 17 (see Figs. 3 and 5). The impression cylinder 11 is provided with a rubber cover 175 and the gripping rollers 58 and 59 with similar rubber covers 176.

It will be obvious that if a series of inked address plates are passed around the magnet cylinder 17 in timed relation to the magazines that each of the said plates will come in contact with one of the magazines passing over the impression cylinder and print the address thereon. The specific design of machine herein described is adapted to print the addresses directly on the covers of the magazines, thus saving the expense of wrapping them. It will be obvious however, that if the magazines had been wrapped previous to piling in chute 3 that the action of the machine would be identically the same and equally effective.

Figures 4, 20:
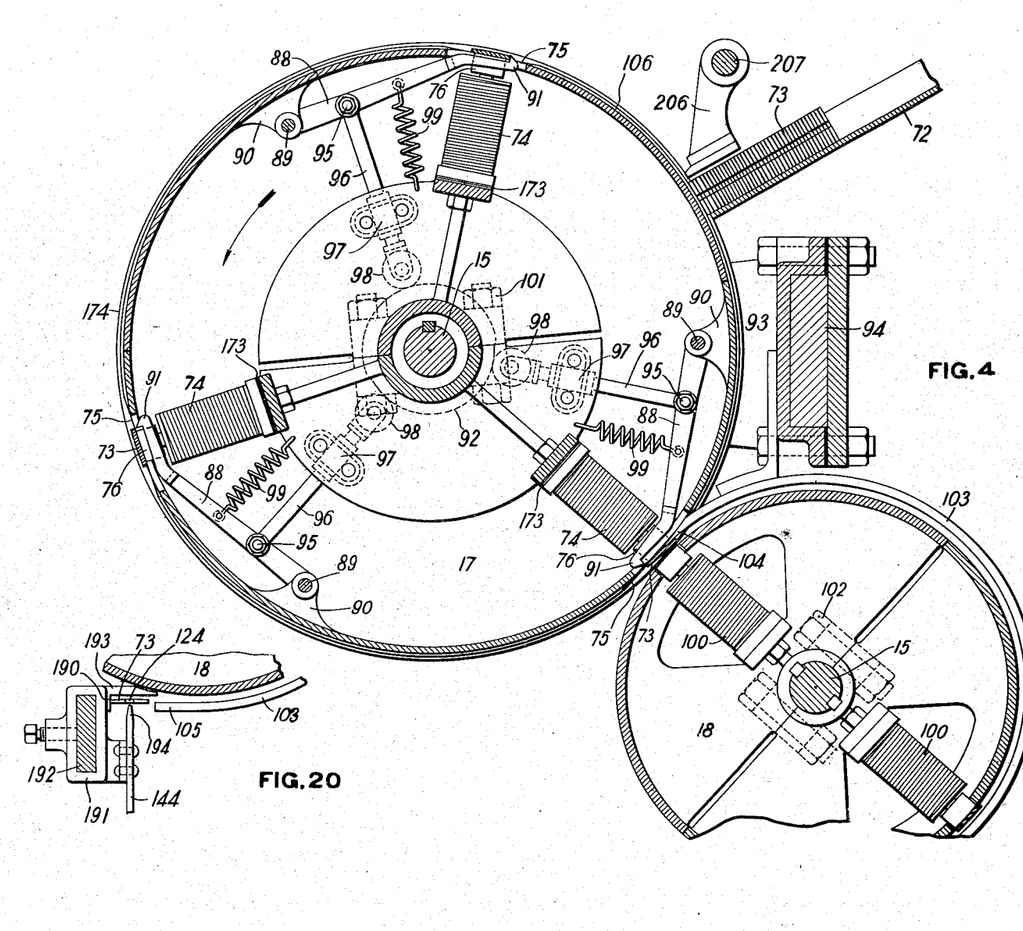
Fig. 4 is an enlarged transverse sectional elevation through the magnet cylinders.
Fig. 20 is an enlarged sectional elevation of the parts immediately below the supplementary magnet cylinder.
Figure 5:
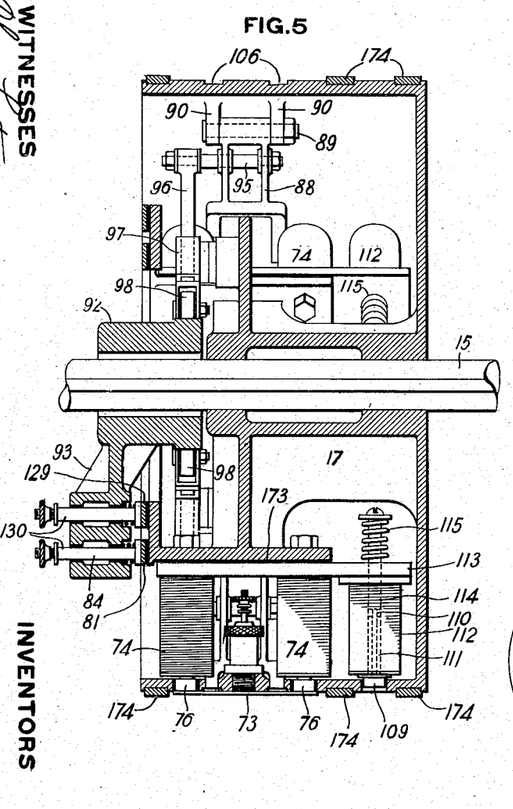
Fig. 5 is a longitudinal section through the main magnet cylinder and the cam therefor.
Figure 6:
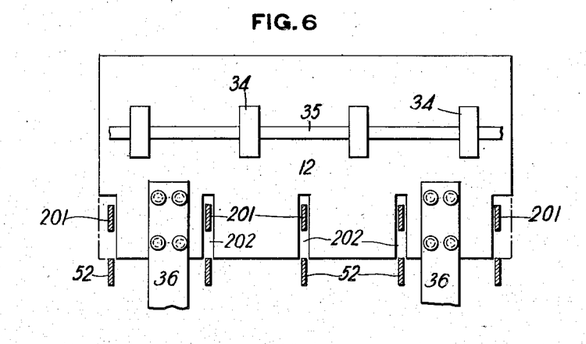
Fig. 6 is an elevation of the feeder plate showing the section of the bridge guides.
Figures 8, 16:
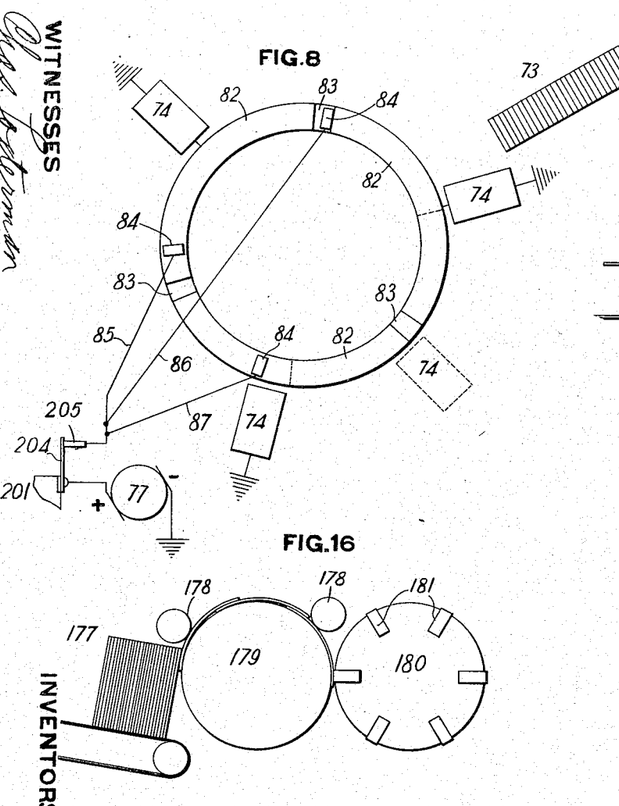
Fig. 8 is a diagram of the electrical circuit for the main magnets.
Fig. 16 is a diagram showing the magazines lapped circumferentially on the impression cylinder.

The address plates 73 which will be described in detail hereinafter, are held in an inclined chute 72 the lower end of which nearly touches the circumference of the magnet cylinder 17. The plates 73 feed by gravity and are successively picked off the lower end of the pile by the following devices, (see Figs. 3—4 and 5): Each of the magnet cylinders is provided with 3 pairs of holding magnets 74 equally spaced around its circumference. At each pair of magnets 74 the surface of the cylinder 17 is flattened as shown at 75. Each magnet 74 is provided with a pole 76 which preferably projects a very slight amount, say one or two thousandths of an inch beyond the surface 75 in order to allow the address plates 73 to make contact with the magnet poles. Current for the energizing of the magnets is furnished by a small generator 77 having a pulley 78 which is frictionally driven by the rim of the pulley 22, the generator 77 being mounted on a hinged plate supported by a bracket 79 and held against the pulley 22 by the spring 80. Referring to Figs. 5 and 8, the commutator ring 81 is provided with 3 segments 82 having interposed insulating pieces 83. Three brushes 84 bear on the segments 82 to supply them with current. The brushes 84 are so spaced as to cut off the supply of current for each magnet just before it reaches a line passing through the centers of the magnet cylinders 17 and 18 and to renew the current supply just before the magnet reaches the lower end of the chute 72. Current passes from the plus brush of the generator 77 through the wires 85—86 and 87 to the brushes 84, thence to the commutator segments 82 and through the magnets 74 to a ground connection on the interior of the cylinder 17. The negative brush of the generator 77 is grounded on one of the side plates 1. As the address plates have considerable inertia and the magnet cylinder 17 is intended to be run at a fairly high speed especially in newspaper work, we do not depend on the grip of the magnets for stripping the address plates 73 off the pile, but provide positive means for doing this consisting of the starting fingers 88 of which there is one for each magnet 74. The starting fingers 88 are pivoted by pins 89 to lugs 90 formed on the interior of the cylinder 17. Each starting finger 88 is provided with a pair of lugs 91 which directly engage the plates. In order that the plates may be stripped from the magnet cylinder 17, it is necessary that the lugs 91 be made to disappear within the cylinder at the stripping point. This action is obtained by means of a stationary cam 92 supported by a bracket 93 which is adjustably mounted on a cross bar 94 secured to the side frames 1. Each starting finger 88 is provided with a pin 95 which connects it to a rod 96. The rods 96 are guided in small guides 97 secured to the magnet cylinder 17 and their inner ends are forked to carry the rollers 98 which roll on the surface of the cam 92. The rods 96 actuate the lugs 91 outwardly through suitable slots in the cylinder 17 and springs 99 produce the opposite motion, the springs 99 having sufficient strength to overcome any centrifugal tendency developed by fingers 88 and rods 96.

In the practical operation of such a machine addressing a periodical having a large circulation, the number of address plates used runs into the hundreds of thousands. In order to conveniently store and handle these plates, they are contained in galleys of convenient length and the machine to be commercially successful must provide for taking plates consecutively from such galleys and returning them thereto after the printing operation in the exact order in which they were received. It will be obvious that in the arrangement shown by us, in which the printing operation is performed between the impression cylinder 11 and magnet cylinder 17, the backs of the address plates must be fed to the magnet cylinder in order to bring the printing face of the address plates against the matter to be addressed. It will be noted further, that when this is done if the plates were stripped from the magnet cylinder 17 and successively fed into galleys that while the order of the plates would be the same as when they were fed to the magnet cylinder, yet their position would be reversed with reference to each other; that is each plate is turned over by the magnet cylinder 17 being received back first and delivered face first. In order therefore to deliver the plates into the receiving galley back first, it is necessary to turn them over again, and for this purpose we have provided a supplementary magnet cylinder 18 which carries a pair of oppositely disposed magnets 100, practically duplicates of the magnets 74. The ratio of the gearing between the cylinders 17 and 18 is as 3 to 2 so that as each magnet 74 passes the tangent or transfer point one of the magnets 100 passes at the same time as shown in Fig. 4. The contour of the cam 92 is such that the springs 99 re-tract the lugs 91 on the starting fingers 88 some time prior to the arrival of that magnet at the transfer point. The magnet cylinder 18 is provided with a commutator similar to that for cylinder 17 supplied by a single brush and having a dead section by which the current is cut off the magnets 100 at the delivery point. The magnets 74 are successively deënergized just before reaching the transfer point and at the transfer point the address plate is therefore attracted by one of the magnets 100 and gently transferred to its pole without shock or jar by reason of the fact that both sets of magnets are running at practically the same speed, and that the movement from one magnet pole to the other is a minute part of an inch. Both the magnet cylinders 17 and 18 are split and provided respectively with clamp bolts 101 and 102 so that these cylinders may be readily adjusted lengthwise of their shafts or easily removed therefrom. When the address plates reach the delivery point they are released by the magnet 100 and their removal is assisted by a pair of stripper guides 103 (see Fig. 4). The stripper guides 103 are provided with wedge shaped ends 104 which ride in the grooves 106 on the magnet cylinder 17 (see Fig. 5). The guides 103 are carried around parallel to the supplementary magnet cylinder 18 and terminate in a horizontal portion 105 (see Fig. 20), off which the address plates 73 slide horizontally against a vertical surface 190 on a bracket 191, the same being adjustably mounted on a cross bar 192. A guard rib 193 is formed on the bracket 191 and the upper ends of guides 144 are secured to the bracket 191. The tops of the guides 144 are beveled as shown at 194 and are so located that when the moving plate 73 is stopped by the surface 190 the notches 124 are just over the beveled ends 194 of the guides 144. The address plate now falls down the guides 144 and arrives at the receiving galley 146 in proper position and sequence.

It will be observed that in some cases the magnet cylinder 18 could be dispensed with and an interior guide substituted therefor between which and the guides 103 the address plate would travel by its own momentum to the guides 144.

The stripper guides 103 are positive in action and will remove the address plates from the magnet cylinder even though the current be kept continuously on the magnets.

Each mailing list is divided into groups which go to certain post offices, or in certain mail bags. It is therefore necessary to provide a simple indicator to inform the operator of the end of each of such groups. We accomplish this by stamping a distinguishing mark upon the paper at the end of the group in line with the address and close to one end thereof. This mark is preferably about one half inch in diameter and made with red ink so as to readily catch the operator's eye. The red ink mark is printed by a button 109 mounted on the end of a brass rod 110 which extends through the core 111 of a solenoid magnet 112 the same being secured to a bar 113 which forms the base or connecting piece for each pair of magnets 74. The armature 114 of the solenoid 112 extends through the bar 113 and is normally held inward by a spring 115 so that the face of the button 109 is within the circumference of the cylinder 17. When the magnet 112 is energized, the armature 114 is attracted by the core 111, thus moving the button 109 radially outward in position to strike the matter being addressed. Current is automatically sent through the solenoid 112 by means which will be better understood after the construction of the address plates have been described in detail.

Figure 7:
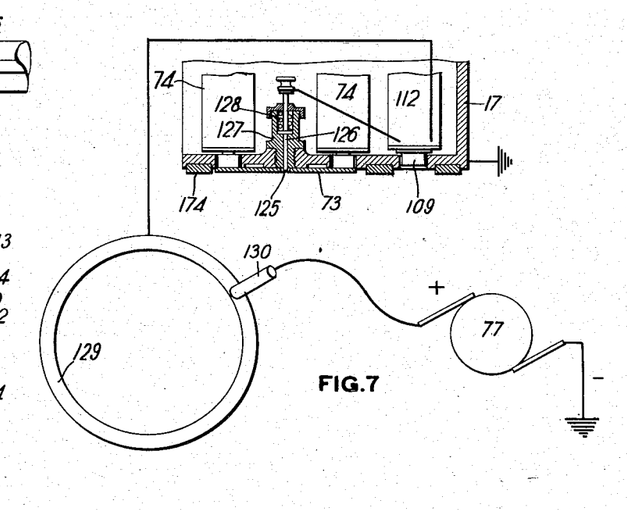
Fig. 7 is a sectional elevation through the magnet cylinder showing the contact pin for the solenoid and a diagram of the electrical connections therefor.
Figures 11, 12, 13:
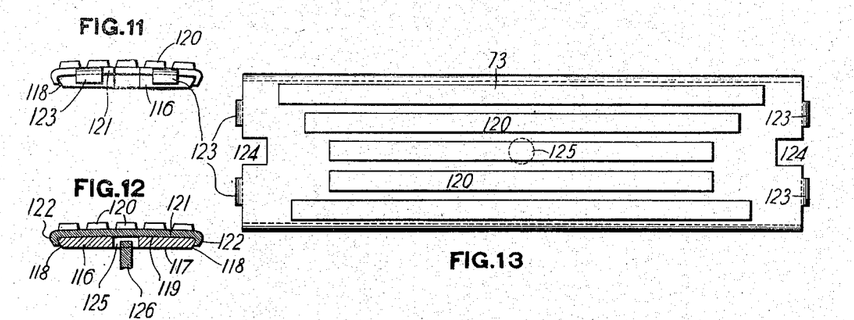
Fig. 11 is an end view of the address plate.
Fig. 12 is a transverse section of the same.
Fig. 13 is a plan view of the same.

Referring to Figs. 11—12 and 13, the preferred form of address plate consists of a soft iron bar 116 which has a flat back 117 beveled edges 118, and a curved face 119. The address is formed in embossed type 120 on a thin sheet metal plate 121 the edges of which are bent over the beveled edges 118 as shown at 122. Projecting lugs 123 are bent over the ends of the bar 116 to retain the plate 121 endwise. The ends of the address plate are provided with notches 124 to engage with the guides which will be hereinafter described. The address plates are of two species, the normal species being provided with a hole 125 and the abnormal species being alike in all other respects, but omitting the hole 125. The purpose of the hole 125 is to provide clearance for a contact pin 126 illustrated in Figs. 5 and 7 and shown in section in Fig. 12. The contact pin 126 is mounted in an insulating bushing 127 and actuated by a small spring 128 so that it normally occupies the position shown in Figs. 7 and 12. The purpose of the hole 125 is to clear the end of the pin 126 so that an electrical contact is not made between the end of the pin and the bar 116. The cylinder 17 is made of brass or non-magnetic material and is connected through its bearings and the frame of the machine with the negative brush of the generator 77. The magnet 112 is in circuit with the pin 126 and the positive brush of the generator 77 through the commutator 129 and the brush 130. If therefore an abnormal plate 73 unprovided with a hole 125 be engaged by the magnet 74, the end of the pin 126 will establish a circuit through the bar 116 to the cylinder 17 thus completing the circuit through the magnet 112 and moving the button 109 out to its printing position.

The bearing brackets 16 for shaft 15 are provided with upward extensions carrying bearings 132 in which is mounted a shaft 133 provided with a pulley 134. A belt 135 connects the pulley 134 with a pulley 136 upon the shaft 13. The shaft 133 carries two sets of ink rollers 137 and 138, the rollers 137 being supplied with red ink for the button 109 and the rollers 138 being supplied with black ink for the address plates 73. The rollers 137 and 138 are adjustable lengthwise of the shaft 133. A shaft 139 below the magnet cylinders 17 is provided with a pair of cleaning brushes 140 and a pulley 141 which is driven by a belt 142 from a pulley 143 upon the shaft 31. The address plates 73 and the buttons 109 are automatically inked and cleaned as above described.

Reverting to Figs. 11—12 and 13, instead of the address plate being composed of a magnetic metal part 116 and an attached soft metal stencil 121 it may be formed in one piece of a magnetic metal such as soft steel. We have determined by experiment, that satisfactory type can be embossed upon thin steel plates with embossing machines of the usual type, and as a matter of simplicity it would appear that such a plate was more desirable than the one herein shown. However, a steel plate while apparently as easily and quickly embossed as a zinc, copper, or aluminum plate produces much more rapid deterioration of the embossing dies. Further, a thin flat plate is not suited for use in this machine, as it does not have sufficient thickness to be engaged with certainty by the starting fingers, as in some cases two plates may be fed instead of one; neither has a thin flat plate sufficient structural strength to resist accidental distortion. Therefore such a plate must be thickened and strengthened by beads or ribs, which in addition to their initial cost, interfere with the smooth sliding of the plates across each other so that the preferable form for a sheet steel plate would be a thin hollow box section. While such a section would present a smooth, flat surface to the magnet poles and could have the same curved face shown in Figs. 11 and 12, it would be unnecessarily expensive and not so rigid as the two part plate. Further, owing to change of address of subscribers to periodicals, the address plates are frequently changed and a steel plate made as above described would be entirely lost. In the two part plate the iron part is a cheap, simple section which can be easily produced by hot rolling and which can be polished and produced in very accurate sizes by cold rolling. The plates can be cheaply sheared to the required length from long bars and the notches 124 and the hole 125 formed at the same operation. The soft metal plate lends itself to embossing and the outline thereof is easily produced by punching, and further, the metal being thin and ductile, it may be easily applied to the bar 116 by hand or with a special tool. The iron bars 116 will last for a life of the machine, and are therefore a permanent asset. When changes in the address are to be made, the soft metal stencil can be removed and blanked out in whole or part and this can be repeated several times. Further, when the end of the post office list changes from one name to another requiring the substitution of a holeless bar for a holed bar 116 the change may be readily effected. In addition to the above the plate shown in Figs. 11 and 12 will withstand any desired printing pressure.

In reading the claims it is to be understood that the words, "magnetic address plates" cover the construction of a plate composed of entirely a magnetic metal, or of a plate composed of a non-magnetic printing face and a magnetic backing or casing. It is obvious that instead of the stencil plate 121 being bent around the bar 116, these conditions could be reversed and the non-magnetic plate partially inclosed in a magnetic casing.

In addition to the above requirements relating to the magnetic properties of a plate, the form of the plate is of prime importance to the successful operation of the machine. It is evident that upon dense hard paper such as is usually used for illustrated magazine covers, that a curved printing surface is essential in the design of machine shown, to produce a clear impression. It is also desirable that the surface of the plate engaged by the magnet poles should be flat for the following reason: When the said surface is flat as shown, corresponding flat places 75 are formed on the magnet cylinder 17. As the plate is engaged by the magnet and stripped from the pile, a peculiar action takes place due to the flat places on the surface of the magnet cylinder, which are approximately one sixteenth of an inch under the circumference of the cylinder. As the cylindrical surface of the cylinder between the magnets revolves in contact with the back of the lower address plate in the chute 72 with but slight friction which can be adjusted by the inclination of the feeding chute 72, the pile of plates is arrested in the chute by the said cylindrical surface. When one of the flat surfaces 75 come opposite the end of the pile of plates, the lower plate is under the action of two forces; first that of gravity, tending to pull it down the chute, and second the attraction of the magnet 74 which is several times the force of gravity, tending to pull it in the same direction. It therefore follows that the first action of the end plate is to jump away from the pile and seat itself upon the magnet poles 76 which are practically in the same plane as the flat surface 75. The plate may or may not reach full contact with the magnet poles before it is engaged by the lugs 91 on the starting fingers, but the result is the same in either case. Owing to the fact that the first plate is acted upon by a total force several times that of gravity and succeeding plates are acted on by gravity only, it is inevitable that the first plate will jump off the pile and be carried clear off the end of the pile by the rotation of the cylinder 17, before the back of the second plate can reach and rub against the type face of the first one. The flattened surfaces 75 on the magnet cylinder therefore act to provide clearance between the engaged plate and the succeeding one, so that the destructive rubbing action between the type face of one plate and the back of the other is entirely eliminated, which contributes greatly to the life of the plates.

In the type of machine shown in Figs. 1—2—3—4—5—6 and 7, it is desirable that the address may be placed on the magazine at any point in its length; this is especially desirable where the address is to be printed directly on the magazine cover which is usually some sort of a design containing more or less favorable spots for the location of the address. In order to vary the position of the address lengthwise of the magazine, it is necessary to vary the relative positions of the magazine and the address plate which may be done either by a side shift of the magazine chute 3 with relation to the machine, or by maintaining a constant position of the chute 3 and shifting the path of the address plates with relation to the impression cylinder, by adjusting the magnet cylinders 17 and 18, the ink rollers 137 and 138, and the cleaning brushes 140 lengthwise of their shafts, and the position of the supply and receiving galleys on their supports. While the adjustment of these elements consumes more time than the adjustment of the magazine chute, yet it keeps down the length of the impression roller to the length or combined lengths of the magazines being fed over it, plus clearance whereas if the chute be shifted, the length of the impression roller must be made equal to the magazine length, plus clearance, plus the adjustment of the chute, thus widening the machine considerably.

As the address plates are stripped off the magnet cylinder by the stripper guides 103 the notches 124 in the plates 73 engage the guides 144 down which they slide piling up against the gate 145. A receiving galley 146 supported by the bracket 147 is in readiness to receive the plates 73 when the gate 145 is removed. The guides 144 are of sufficient length to provide storage for two or three galleys full of plates and the same is true of the feed chute 72. The address plates 73 are placed in the feed chute 72 manually, the operator guiding the first plates against the rear end of the pile and the plates are kept on edge by their piled relation and the contact of the first plate with the magnet cylinder 17. When the plates however, are delivered automatically from the stripper 103 means must be provided for keeping them on edge until they are safely in the receiving galley which is accomplished by the guides 144. As the notches 124 at the ends of any plate may be of unequal smoothness or as one of the guides 144 may be lubricated differently from the other, it is necessary to provide means for keeping the plates approximately at right angles to the guides 144 during their downward movement in order that they may not drop off the guides. For this purpose we provide two or more small shafts 148 preferably mounted in antifriction bearings and each provided with a pair of star wheels 149 having alined teeth. The hub of one of the star wheels is provided with a small notch 150 in line with each tooth of the wheel which is engaged by the end of a light spring 151 with just sufficient force to position a tooth in readiness for the next arriving address plate. The star wheels are preferably located directly below guides 144 so that each end of each down coming address plate strikes a tooth of one of the star wheels. If one end of the address plate is ahead of the other, that end will be retarded and the address plate squared up with the guides 144 as will be readily understood.

Figures 1, 21, 22:
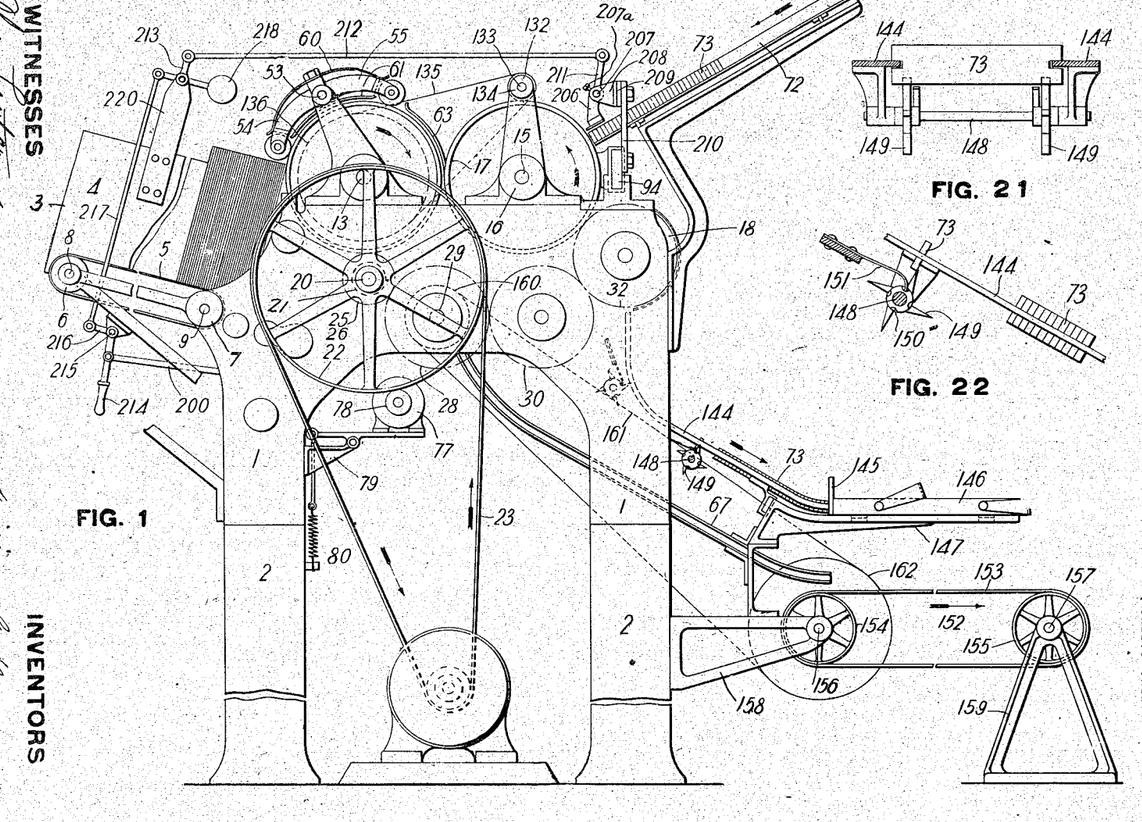
Figure 1 is a side elevation of a complete addressing machine according to our invention.
Fig. 21 is a cross section through the delivery guides for the address plates showing the star wheels and Fig. 22 is a side elevation of the same.

The addressed magazines are preferably delivered on the right hand of the machine as shown in Fig. 1, as this delivery brings the address on top in view of the operator. From the guides 67 the magazine drops on a belt conveyer 152 composed of the tapes 153 which operate over pulleys 154 and 155 which are respectively mounted on shafts 156 and 157. The shaft 156 is mounted in bearing brackets 158 secured to the legs 2 and the shaft 157 is mounted in a pair of standards 159 which may be any desired distance from the machine and the shaft 157 may be at a higher or lower level than the shaft 156. The conveyer 152 is driven by a pulley 160 on shaft 29 by means of a belt 161 running over a pulley 162 on shaft 156. The tapes 153 are preferably driven at a speed which will deliver the magazines in lapped order, the leading edge of each magazine being a distance in the rear of its predecessor sufficient to expose the red ink mark.

Figure 2:
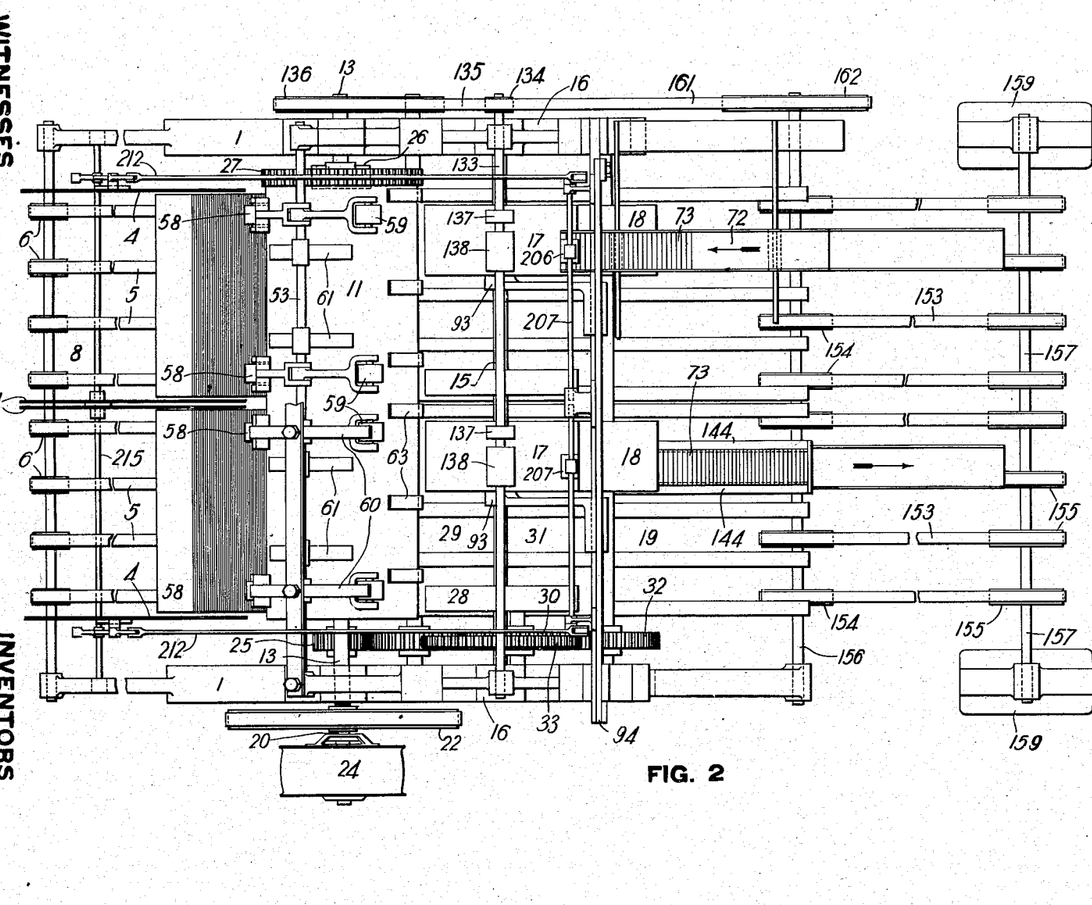
Fig. 2 is a plan view of the same.

From the above description the operation of the machine will be readily understood. The magazines are piled on edge in the chute 3; the feeding chute 72 is filled with address plates and the machine started. After being started the machine is entirely automatic, no further attention being required than to supply and remove the magazines and the address plates. The machine shown in Fig. 2 is a double machine, two sets of magazines being fed simultaneously, although Fig. 1 would apply equally well to a single machine.

It is obvious that the machine could be widened to feed any desired number of magazines and increased capacity is more cheaply obtained in a multiple machine as well as economy of space. In a multiple machine however, it is necessary to provide means for independently stopping the feed of both magazines and address plates, as interruptions may occur to the supply of any unit of the machine without affecting the others. To this end we have provided a manually operated lever which controls simultaneuosly, the feed of the magazines by each feeder plate 12, the downward travel of the address plates in each feeding chute 72, and the supply of current to each magnet cylinder 17 as illustrated in Figs. 1—2—3, etc.

The guides 52 are connected by pins 196 to the levers 197 secured to the rock shaft 198 which is operated through a lever 199 by the link 200. The guides 52 are provided with fingers 201 which work through slots 202 in the feeder plate 12. The front ends of the guides 52 are supported and guided in grooves on a cross bar 203. The ends of the fingers 201 normally lie back of the feeder plate 12, but when the link 200 is forced to the right, the fingers 201 are moved against the first magazine 10 and force it to the left out of engagement with the ledge 50 thus stopping the feed of the magazines. The electrical contacts 204 and 205 which are included in the circuit to the magnets 74 are also separated by this movement, the contact 204 being mounted on one of the fingers 201 and the contact 205 being supported by the frame of the machine; both contacts of course being suitably insulated.

To stop the feed of the incoming address plates we have provided a clamp 206 mounted on a light shaft 207 supported in bearings 208 on a cross bar 209 the same being supported by vertical pieces 210 secured to the guide bar 94. The clamp 206 is adjustable along the shaft 207 by means of a set screw 207^A to suit the position of the chute 72. A lever 211 is secured to the shaft 207 and operated by a link 212 which receives motion from a bell crank 213 pivoted to a bracket 220 secured to one of the side plates 4. The hand lever 214 fulcrumed on the pin 215 is provided with an angular extension 216 which is connected by a link 217 to the bell crank 213. A counter balance weight 218 on the bell crank 213 retains the parts in the position shown in Fig. 1. When the hand lever 214 is thrown to the right the fingers 201 are operated to stop the feed of the magazines. The current supply to the magnets 74 is cut off by the separation of the contacts 204 and 205 and the lamp 206 is applied to the lower end of the pile of plates 73 to prevent their further motion.

It will be understood that each unit of the machine is provided with the above described devices, so that the operation of any unit may be stopped without interfering with the others. It is further obvious that any unit of the machine can be used independently of the other units by merely restricting the supply of magazines and address plates to that unit.

Figure 9:
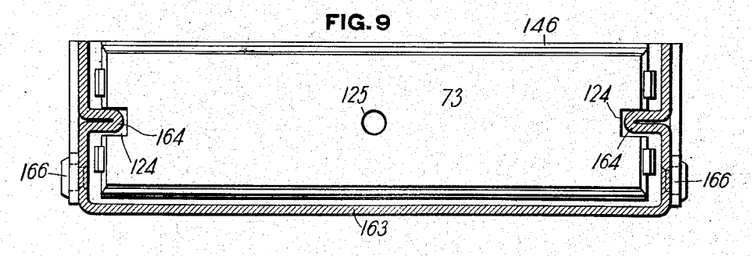
Fig. 9 is a section through the storage galley for the address plates.
Figure 10:
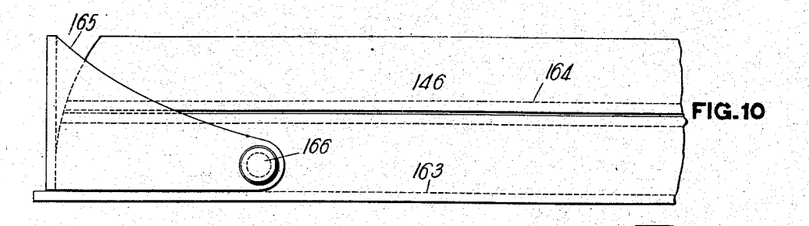
Fig. 10 is a side elevation of the same.

In Figs. 9 and 10 we have illustrated a preferred form of storage galley for the address plates. The galley 146 is provided with a body portion 163 formed of sheet metal and having a pair of inwardly projecting longitudinal ribs 164 to engage the notches 124 in the address plates. The galley is provided with a pair of hinged ends 165 pivoted to rivets 166. Either end of the galley may be opened to receive or discharge plates, and in practice the plates enter at one end and are discharged from the other.

Figure 14:
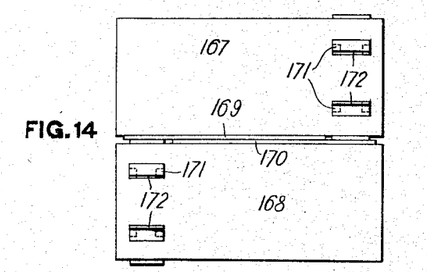
Fig. 14 is a diagram showing the magnet and impression cylinders combined and magazines lapped longitudinally.
Figure 15:
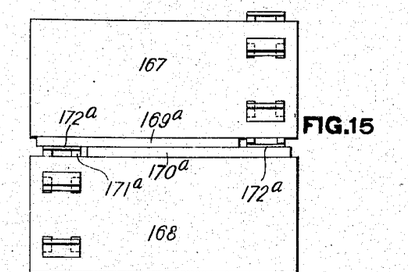
Fig. 15 is a similar diagram showing a radial adjustment of the magnets to accommodate different thicknesses of magazines.

In Fig. 14 we have illustrated diagrammatically, a pair of cylinders 167 and 168 which are combined impression and magnet cylinders. In this case the magazines 169 and 170 are passed between the cylinders simultaneously and offset endwise to leave space for the address. Magnet poles are represented at 171 and address plates at 172. In Fig. 15 the magazines 169^a and 170^a are shown of increased thickness and a corresponding adjustment is shown in the magnet poles 171^a, they being moved radially outward with respect to the cylinders 167 and 168 which adjustment is affected by the use of liners 173 under the magnets (see Figs. 4 and 5).

It will be obvious that by changing the ratio of the gears 26 and 27 to speed up the shaft 20 that more magazines will be fed than can lie flat on the impression cylinder 11 and that they will therefore pass over the same in lapped order. This is illustrated in Fig. 16 in which the magazines 177 are fed between the gripping rollers 178 and the impression cylinder 179 and between the impression cylinder 179 and the magnet cylinder 180 which is provided with the magnets 181. In this case six magazines are fed per revolution of the cylinders 179 and 180 and the magnet cylinder 180 is provided with six magnets. It is thus easily possible to double the capacity of the machine shown in Figs. 1—2—3 when working on thin magazines.

Figure 17:
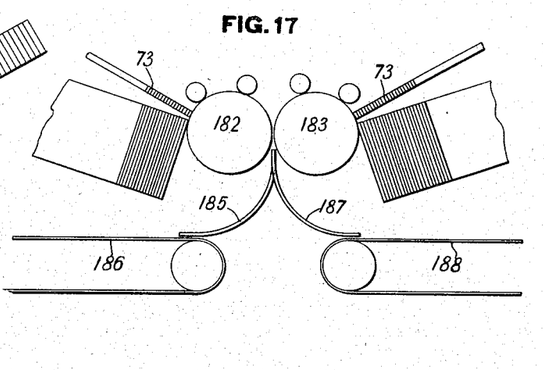
Fig. 17 is a diagram showing in elevation a modified construction in which the magazines are fed from both sides of the machine and delivered to the opposite sides from which they are fed.
Figure 18:
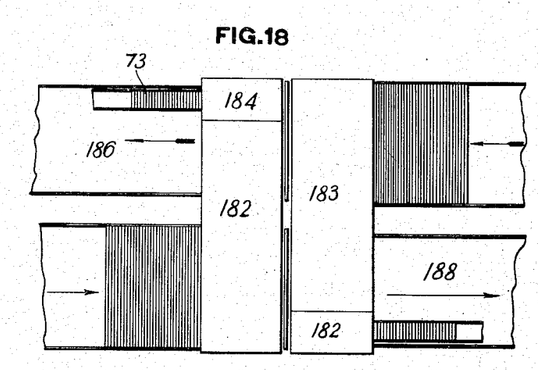
Fig. 18 is a plan view of the same.

A further modification of our improved machine is shown in Figs. 17 and 18 in which the magazines are fed from both sides of the machine and delivered to the opposite side. In this case the cylinders 182 and 183 act as combined magnet and impression cylinders, the magnets being placed in the rectangles 184. The magazines passing over the cylinder 183 are addressed by the magnets on the cylinder 182 and are delivered through the guide 185 and to the conveyer 186; while the magazines passing over the cylinder 182 are addressed by the magnets on the cylinder 183 and are delivered through the guide 187 to the conveyer 188.

It will be thus seen that our invention is not confined to one specific form of machine, but has very wide application and may be combined in a great many ways with other mechanisms to place an address upon various sizes, shapes, and qualities of addressable matter, and in various stages of the production of said matter. We therefore do not wish to be limited to the precise form and arrangement of parts herein shown, but desire to claim and hold as ours, all the patentable subject matter covered by the following claims.

We claim—

1. In an addressing machine, an impression cylinder, a shaft parallel thereto, a magnet cylinder on said shaft, means for feeding matter to be addressed between the cylinders, means for feeding address plates to and from the magnet cylinder, and means for varying the position of the address on the matter printed.

2. In an addressing machine, an impression cylinder, a shaft parallel thereto, a magnet cylinder on said shaft, means for feeding matter to be addressed between the cylinders, means for feeding address plates to and from the magnet cylinder, and means for adjusting the magnet cylinder along its shaft whereby the position of the address is varied on the matter being printed.

3. In an addressing machine, an impression cylinder, a shaft parallel thereto, a magnet cylinder on said shaft, a pair of guides partly surrounding said impression cylinder, means for adjusting said magnet cylinder along its shaft, and means for adjusting said guides in the same direction.

4. In an addressing machine, an impression cylinder, a magnet cylinder, magnets each provided with a coacting projection to engage the address plates thereon, a supply of magnetic address plates and means for successively energizing said magnets during a part revolution of the magnet cylinder, and for deënergizing same during the remainder of the revolution.

5. In an addressing machine, an impression cylinder, a magnet cylinder, a series of magnets thereon, an inclined pile of address plates having its lower end in contact with the magnet cylinder, a device for each magnet mounted on said cylinder projecting beyond the circumference on the magnet cylinder to engage an address plate, and means for causing said projecting device to disappear within said circumference for a portion of a revolution of said magnet cylinder.

6. In an addressing machine, an impression cylinder, a magnet cylinder, a magnet thereon, a pile of address plates having one end in contact with the magnet cylinder, a pivoted starting finger for stripping said plates off the pile, a cam roller, a connection between said roller and said finger, and a stationary cam around which said roller operates.

7. In an addressing machine, an impression cylinder, a shaft parallel thereto, a magnet cylinder mounted on said shaft and adjustable lengthwise thereof, a magnet on said magnet cylinder, a starting finger on said magnet cylinder arranged to project beyond the circumference thereof or to disappear within the same, a stationary cam for operating said starting finger, a support for said cam parallel to said shaft, and means for adjusting said cam along said support.

8. In an addressing machine, an impression cylinder, means for passing matter to be addressed over said cylinder in a fixed relation thereto, a magnet cylinder parallel to said impression cylinder and close thereto, a supply of address plates, magnets on said magnet cylinder for carrying said address plates to make contact with the matter to be addressed, starting fingers on said magnet cylinder one for each magnet, a stationary cam for operating said starting fingers, means for adjusting said magnet cylinder laterally so as to vary the position of the address on the matter being addressed, and means for adjusting said cam to keep it in fixed relation to said magnet cylinder.

9. In an addressing machine, an impression cylinder, a magnet cylinder, a magnet mounted thereon, means for feeding address plates successively to said magnet cylinder including an inclined chute whereby they are carried by the magnet past the impression cylinder, means for feeding matter to be addressed over the impression cylinder in timed relation to the travel of the address plates, and a stationary stripping device for removing said address plates from the magnet cylinder after the address has been printed.

10. In an addressing machine, an impression cylinder, a magnet cylinder parallel thereto, means for passing papers between the impression cylinder and the magnet cylinder, a supply of address plates, a main magnet on said magnet cylinder for holding an address plate thereto, a marker normally below the surface of the magnet cylinder and extensible beyond said surface, and a supplementary magnet on the magnet cylinder for operating the marker.

11. In an addressing machine, an impression cylinder, a magnet cylinder, means for passing matter to be addressed between said cylinders, a supply of address plates comprising two species of plates, the normal plates being provided with a recess, and the abnormal plates being without a recess a magnet on the magnet cylinder for successively engaging and holding the plates, a marking device, a supplementary magnet for operating said marking device, and a contact pin for closing the circuit to said supplementary magnet, said pin being arranged to enter the recess in the normal address plates without making contact, and to make contact with the bottom of the abnormal plates.

12. In an addressing machine, an impression cylinder, a magnet cylinder provided with co-acting abutments, one for each magnet, means for passing matter to be addressed between said cylinders, a supply of address plates comprising two species both of the same length, magnets on the magnet cylinder for engaging said address plates and carrying them past the printing point, a supplementary magnet and a marking device operated thereby, means whereby said marking device is unaffected by one of said species of plates, and is caused to operate by the other of said species of plates.

13. In an addressing machine, an impression cylinder, a metal magnet cylinder, means for feeding matter to be addressed between said cylinders, two species of address plates one of said species having a recess, and the other being without a recess, a commutator ring carried by said magnet cylinder and insulated therefrom, a source of electric current, one side of the line being connected to said commutator ring by a brush, and the other being grounded on the frame of the machine, a marking device, a magnet for operating the same, a contact pin, said magnet being in the circuit between said pin and said commutator, an insulating support for said contact pin which allows the same to project beyond the circumference of the magnet cylinder, means carried by said magnet cylinder for successively engaging and holding said address plates in such a manner that the recess in recessed plates will surround the projecting end of the contact pin without touching the same and that a non-recessed plate will establish a circuit between the end of the contact pin and the grounded surface of the magnet cylinder.

14. In an addressing machine, an inclined chute arranged to hold parcels of matter to be addressed, an impression cylinder, a supply of address plates and means for feeding the same successively past the impression cylinder, gripping rollers co-acting with said impression cylinder, and a feeder for feeding the parcels to be addressed to said impression cylinder and gripping rollers in timed relation to said address plate feeding means.

15. In an addressing machine, a chute arranged to hold a pile of magazines on edge therein, an impression cylinder in contact with one end of said pile of magazines, gripping rollers co-acting with said impression cylinder, a supply of address plates and means for feeding them successively past the impression cylinder, and a feeder for lifting the magazines into position to be engaged by the impression cylinder and the gripping rollers.

16. In an addressing machine, a chute containing a pile of magazines, an impression cylinder rotating in contact with the magazine at the end of the pile, a supply of address plates and means for feeding them successively past said impression cylinder, and a feeder for feeding the end magazine off the pile to the impression cylinder.

17. In apparatus for printing, a main rotary magnet, a supply of magnetic address plates arranged to be engaged by said magnet and carried past a printing point, means for feeding said plates successively to said magnet, and a supplementary rotary magnet geared to said main magnet and arranged to pick said address plates successively off said main magnet and to release them at a desired point.

18. In apparatus for printing, a supply of magnetic printing plates, and means for carrying said plates through a tortuous path, comprising a plurality of rotary magnets rotating in close proximity and geared together so that the magnetic plate is picked off one magnet by another magnet.

19. In an addressing machine, a supply of magnetic address plates each having a type face and a back adapted to be engaged by the poles of a magnet, a main rotating cylinder, a holder arranged to feed said plates by gravity against said main rotating cylinder, magnets carried by said cylinder arranged to grip the back of a plate and carry the plate past a printing point, a supplementary rotating cylinder, magnets carried thereby, said supplementary and said main cylinders being so geared together that their magnets pass a transfer point at the same time, means for cutting off the magnetism of the main magnets just prior to reaching said point, whereby the printing plates are attracted and held by the supplementary magnet, the poles of said magnet engaging the printing face of said plates; a receiving guide beyond said transfer point, and means for stripping said address plates from said supplementary magnet and delivering them to said receiving guide with their backs forward so that they enter the receiving guide in the same order as they left the holder.

20. In an addressing machine, an impression cylinder, a main magnet cylinder, means for feeding magnetic address plates to said main magnet cylinder, a supplementary magnet cylinder geared to said main magnet cylinder, and a curved guard surrounding a portion of the circumference of said supplementary magnet cylinder, said guard having a wedge shaped end in contact with said main magnet cylinder for stripping the address plates therefrom.

21. In an addressing machine, an impression cylinder, a magnet cylinder, a supply of magnetic address plates stored in portable galleys, an inclined feeding holder for said address plates having one end closely adjacent to said magnet cylinder and having a capacity considerably in excess of one of said storage galleys, a receiving guide having an inclined portion arranged to receive said address plates after they leave the magnet cylinder, the inclined portion of said guide having a capacity considerably more than a galley full of address plates, a curve in said guide for obtaining horizontal delivery, and an empty galley in line with the lower end of said guide to collect the address plates for storage said empty galley being horizontal.

22. In an addressing machine, an impression cylinder, a magnet cylinder, a series of magnets thereon, an inclined pile of address plates having its lower end close to the magnet cylinder, and a device for each magnet mounted on said magnet cylinder and projecting beyond the surface thereof for starting the address plates off the pile.

23. In apparatus for printing, a main rotary magnet, a supply of magnetic address plates arranged to be engaged by said magnet and carried past a printing point, means for feeding said plates successively to said magnet, and a supplementary rotary device geared to said main magnet and arranged to pick said address plates successively off said main magnet and to release them at a desired point.

WILLIAM G. SLAUSON.
WALTER W. MACFARREN.

Witnesses:
CHAS. LOXTERMAN,
ROSE NEVIN.